US010412437B1

(12) United States Patent
Riding

(10) Patent No.: US 10,412,437 B1
(45) Date of Patent: Sep. 10, 2019

(54) METHOD AND SYSTEM FOR DETECTING A MOBILE PAYMENT SYSTEM OR AN ELECTRONIC CARD IN AN ENVIRONMENT ASSOCIATED WITH A CONTENT PRESENTATION SYSTEM PRESENTING CONTENT

(71) Applicant: WideOrbit Inc., San Francisco, CA (US)

(72) Inventor: Christopher M. Riding, Santa Clarita, CA (US)

(73) Assignee: WideOrbit Inc., San Francisco, CA (US)

( * ) Notice: Subject to any disclaimer, the term of this patent is extended or adjusted under 35 U.S.C. 154(b) by 0 days.

(21) Appl. No.: 15/791,918

(22) Filed: Oct. 24, 2017

Related U.S. Application Data

(63) Continuation-in-part of application No. 15/352,980, filed on Nov. 16, 2016, now Pat. No. 10,057,746.

(51) Int. Cl.
| *H04N 21/274* | (2011.01) |
| *H04L 29/08* | (2006.01) |
| *G06Q 20/32* | (2012.01) |
| *H04N 21/218* | (2011.01) |

(52) U.S. Cl.
CPC ....... *H04N 21/274* (2013.01); *G06Q 20/3278* (2013.01); *H04L 67/306* (2013.01); *H04N 21/218* (2013.01)

(58) Field of Classification Search
CPC ............... H04N 21/274; H04N 21/218; G06Q 20/3278; H04L 67/306
See application file for complete search history.

(56) References Cited

U.S. PATENT DOCUMENTS

| 7,690,013 | B1* | 3/2010 | Eldering ................ G06Q 30/02 725/32 |
| 8,731,610 | B2 | 5/2014 | Appaji |
| 8,806,530 | B1 | 8/2014 | Izdepski et al. |
| 9,189,287 | B1 | 11/2015 | Elder |
| 9,614,734 | B1 | 4/2017 | Lazarescu et al. |
| 2002/0100046 | A1 | 7/2002 | Dudkiewicz |
| 2008/0306849 | A1* | 12/2008 | Johnson, Jr. ............ G06F 21/35 705/35 |
| 2011/0247036 | A1 | 10/2011 | Adimatyam et al. |
| 2012/0032894 | A1 | 2/2012 | Parivar et al. |
| 2013/0036434 | A1* | 2/2013 | Shkedi ............... H04N 21/4524 725/14 |
| 2013/0110900 | A1 | 5/2013 | Des Jardins et al. |
| 2013/0144940 | A1 | 6/2013 | Law |
| 2013/0157563 | A1* | 6/2013 | Jain ..................... H04B 5/0031 455/41.1 |

(Continued)

*Primary Examiner* — Hunter B Lonsberry
(74) *Attorney, Agent, or Firm* — Invoke

(57) ABSTRACT

A method includes identifying content displayed by a content presentation system associated with a physical environment. A mobile payment system and/or an electronic card is detected within the physical environment associated with the content presentation system. Responsive to the detecting operation, information, associated with the content, is transmitted to a user device of a user associated with the mobile payment system and/or the electronic card. Responsive to detecting operation, an identifier corresponding to the content is stored in association with a profile related directly or indirectly to the mobile payment system and/or the electronic card.

20 Claims, 3 Drawing Sheets

(56) References Cited

U.S. PATENT DOCUMENTS

| | | | |
|---|---|---|---|
| 2013/0167167 A1* | 6/2013 | Steyer | H04N 21/2543 725/5 |
| 2014/0082654 A1 | 3/2014 | Van et al. | |
| 2014/0280879 A1 | 9/2014 | Skolicki | |
| 2014/0359647 A1 | 12/2014 | Shoemake et al. | |
| 2015/0112796 A1 | 4/2015 | Greenzeiger et al. | |
| 2015/0331655 A1 | 11/2015 | Candelore | |
| 2016/0037213 A1 | 2/2016 | Collins et al. | |

* cited by examiner

METHOD AND SYSTEM FOR DETECTING A MOBILE PAYMENT SYSTEM OR AN ELECTRONIC CARD IN AN ENVIRONMENT ASSOCIATED WITH A CONTENT PRESENTATION SYSTEM PRESENTING CONTENT

BENEFIT CLAIM; INCORPORATION BY REFERENCE

This application claims priority as a continuation-In-Part of U.S. Non-Provisional application Ser. No. 15/352,980, filed on Nov. 16, 2016, which is hereby incorporated by reference.

TECHNICAL FIELD

The present disclosure relates to transmitting or recording information in response to detecting a mobile payment system and/or an electronic card in a physical environment associated with a content presentation system displaying particular content.

BACKGROUND

Bluetooth is a global wireless communication standard that is used for communication between Bluetooth enabled devices. Bluetooth technology may be used for exchanging data over short distances (e.g., using short-wavelength UHF radio waves in the ISM band from 2.4 to 2.485 GHz) from fixed and mobile devices, and building Personal Area Networks (PANs).

Among the various Bluetooth technologies, Bluetooth Low Energy (BLE) is a wireless personal area network technology. BLE may also be referred to, for example, as Bluetooth LE, or Bluetooth Smart. BLE is designed and marketed by the Bluetooth Special Interest Group. BLE is aimed at novel applications in the healthcare, fitness, beacons, security, and home entertainment industries. Compared to Classic Bluetooth, Bluetooth Smart is intended to provide considerably reduced power consumption and cost than Classic Bluetooth while maintaining a similar communication range as Classic Bluetooth. A detection device may "ping" surrounding devices using BLE signals. In response to receiving a BLE signal, a receiving device may respond with an identifier (e.g., a Media Access Control address) used to identify and/or locate the receiving device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

General Overview

One or more embodiments include presenting information associated with content presented by a content presentation system within a physical environment. A mapping engine identifies content displayed by a content presentation system within the physical environment. The mapping engine further identifies a client device detected within the same physical environment during a period of time when the content was displayed by the content presentation system. The client device may be identified using Bluetooth Low Energy (BLE) transmitters (e.g., BLE beacons or BLE ibeacons) or using other device detection technology. In response to identifying the client device within the same physical environment during the period of time when the content was displayed, the mapping engine stores the client device (or a user thereof) in association with the content. A profile builder builds a profile identifying all of the content that is presented by the content presentation system during time periods when the client device was detected in the same physical environment as the content presentation system. An information distribution engine selects and transmits information, based on the content, to the detected client device or to other devices associated with the same user as the detected client device.

A. Architechtural Overview

Figure 1:
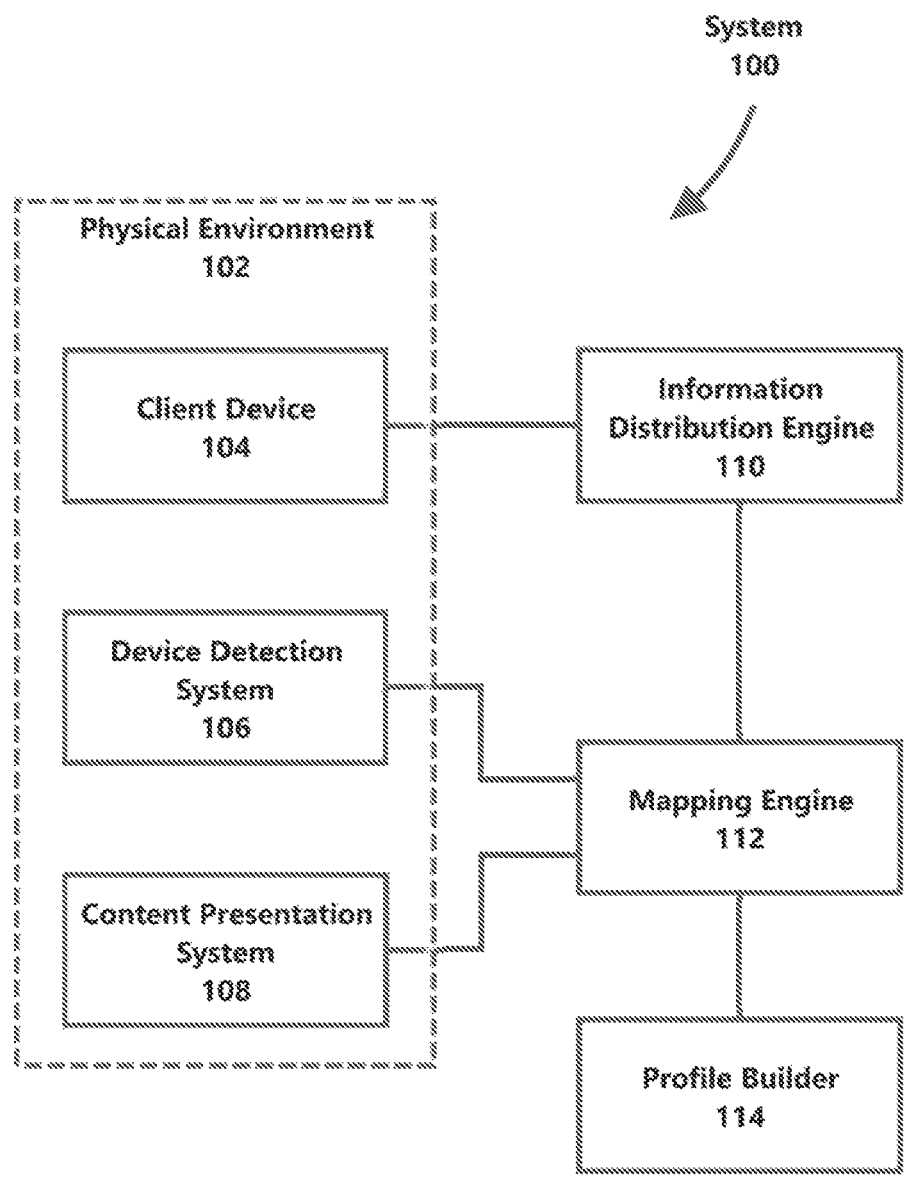
FIG. 1 shows a block diagram example of a system in accordance with one or more embodiments.

FIG. 1 shows a block diagram example of a system 100 which includes different types of components in accordance with one or more embodiments. The example of system 100, as illustrated in FIG. 1, includes a client device 104, a device detection system 106, a content presentation system 108, an information distribution engine 100, a mapping engine 112, and a profile builder 114. In one or more embodiments, system 100 may include more or less components, than the components illustrated in FIG. 1.

A component within system 100 may correspond to a single digital device or a combination of multiple digital devices. The term "digital device" generally refers to any hardware device that includes a processor. Examples of digital devices include a computer, a tablet, a laptop, a desktop, a netbook, a cellular phone, a television, a monitor, a content receiver, a set-top box, a streaming stick, a video gaming console, a mobile handset, a smartphone, a personal digital assistant "PDA", a Bluetooth enabled device, a Bluetooth Low Energy (BLE) transmitter, a wireless receiver and/or transmitter, an access point, a base station, a communication management device, a router, a switch, and/or a controller. Two or more components within system 100 may be communicatively coupled via a local area network, a wide area network, the internet, an intranet, a cellular network, and/or combinations thereof.

Some components of the system 100 may be within a same physical environment while other components may be outside of that physical environment. The example of system 100, as illustrated in FIG. 1, includes a client device 104, a device detection system 106, and a content presentation system 108 within a same physical environment 102. Other components (e.g., information distribution engine 110, mapping engine 112, and profile builder 114) may also be located within the physical environment 102 or outside of the physical environment 102. As an example, at least one component of the information distribution engine 110 may be implemented on a web server remotely located from the physical environment 102. The physical environment 102, as referred to herein, may include any physical space where a content presentation system 108 may be located. Examples of physical environment 102 include, but are not limited to a room in a home, a classroom, an office, a hallway, an event venue, a bar, etc. A physical location may be defined as a physical space that is within a communications range of a radio signal transmitted by a component of the device detection system 106 (e.g., a BLE signal). In an example, detecting a client device 104 within a same physical location as a content presentation system 108 includes determining both (a) that the client device 104 is within a radio signal range of a component of the device detection system 106, and (b) the client device is within a threshold distance from the component of the device detection system or a threshold distance from the content presentation system 108. A client device located in family room with the television may be determined to be in a same physical environment as the television. In contrast, another device located in a bedroom which is separate from the family with the television may not be determined to be in a same physical environment as the television.

In an embodiment, client device 104 is a digital device associated with a corresponding user. The client device 104 may be, for example, a personal mobile device such as a cell phone, tablet, or laptop used by a corresponding user. The client device 104 may be used by a user to consume data, generate data, and/or transmit data. A client device 104 when actively being used by a user may transmit data, receive data, or be moved from one location to another location. The client device 104 when actively used by a user may be rotated, angled, lifted, dropped, or otherwise physically moved by a user. A client device may even be moved while being held in a user's pocket or purse. Physical movement of the client device by a user, even when the client device is not displaying any data, may be referred to herein as active use by the user.

In an embodiment, a device detection system 106 includes hardware and/or software which detects a client device 104 within a same physical environment 102 as the device detection system 106. The device detection system 106 may detect the presence of the client device 104 within a physical environment 102. The device detection system 106 may detect an exact or an approximate location of the client device 104. The device detection system 106 may determine a distance of the client device 104 from the device detection system 106, or from any other component. The client device 104 may be determined to be within a same physical environment 102 as the content presentation system 108 if the client device 104 is within a threshold distance from the content presentation system 108. The client device 104 may be determined to be within a same physical environment 102 as the content presentation system 108 if the client device 104 is within one or more predetermined regions associated with the content presentation system 108.

The device detection system 106 detects a client device 104 and/or a mobile payment system using any wireless technology. In an example, the device detection system 106 includes a set of Bluetooth Low Energy (BLE) beacons. The BLE beacons may be used to detect a client device 104. Detecting a client device using BLE beacons is described below with reference to FIG. 2. In another example, the device detection system 106 may include access points which may be used for detecting a client device 104 via W-Fi signals. In another example, the device detection system 106 uses Near-Field Communication (NFC).

One or more components of the device detection system 106 may be implemented on the client device 104 itself. For example, an application executing on the client device 104 may aggregate information about wireless signals detected by the client device 104. The client device 104 may transmit the wireless signal information to another component of the device detection system 106 which computes a location of the client device 104. Information associated with wireless signals received by the client device 104 from other devices and/or information associated with wireless signals received by other devices from the client device 104 may be used to determine the location of the client device. The location of the client device 104 is used to determine whether the client device 104 is within the same physical environment 102 as the content presentation system 108.

In an embodiment, the device detection system 106 is configured to detect a mobile payment system. The device detection system may identify a user based on an association between the user and the detected mobile payment system. A mobile payment system may include a client device executing an application for making a payment. The payment may be in any currency, including but not limited to real currency, physical currency, digital currency, cryptocurrency, or electronic currency. A mobile payment system may refer to a credit card or other physical payment component which may detected by the device detection system 106. The credit card or other physical component (or information thereof) be stored or implemented directly on or separately from a cellular phone, or electronic device.

In an embodiment, the device detection system 106 is configured to detect an electronic card. The device detection system may identify a user based on an association between the user and the electronic card. Examples of electronic cards include, but are not limited to electronic identity documents, keycards, and electronic key smartcards. Electronic cards may include components that may be detected by the device detection system 106. Electronic cards may refer to or include the mechanical holecard, barcodes, magnetic stripes, Wegand wire embedded cards, smart card (embedded with a read/write electronic microchip), and RFID proximity cards.

In an embodiment, a content presentation system 108 includes hardware and/or software to present content. A content presentation system 108, as referred to herein, may include any device and/or application that causes the presentation of content. A content presentation system 108 may display visual content and/or play audio content. A content presentation system 108 may correspond to a cable set-top box that transmits a media stream to a television for display. Content presentation system 108 may include a desktop which receives a media stream from a web server and displays the media stream on a monitor. The content presentation system 108 may correspond to a USB streaming stick which receives the content wirelessly via an access point and displays the content on a monitor. A content presentation system 108 may be a radio which plays audio content. A content presentation system 108 may be an audio stream stick which receives a stream via an access point and streams the music via a speaker system.

In an embodiment, a mapping engine includes hardware and/or software which maps a detected client device 104 to content presented by the content presentation system 108. In an embodiment, the mapping engine 112 includes functionality to receive device information from the device detection system 106. As an example, the mapping engine 112 may receive information in real-time identifying devices that are currently in a physical environment 102 associated with a content presentation system 108. The mapping engine 112 may receive information on a delayed basis which identifies which client devices were detected within the physical environment 102 and during which respective time periods.

In an embodiment, the mapping engine 112 includes functionality to receive information about content being displayed ("content information") from the content presentation system 108 (or from another component or system). The content information may be received in real-time identifying content that is currently being presented by the content presentation system 112. The content information may be received on a delayed basis and identify what content was presented during what respective time periods.

In an embodiment, the mapping engine 112 includes functionality to map client devices to displayed content. If a client device is detected during a same time period during which and where the particular content is displayed, then the client device may be mapped to the particular content. In an embodiment, the mapping engine 112 maps a user associated with a client device to the content instead of or in addition to mapping the client device to the content.

In an embodiment, a profile builder 114 includes hardware and/or software to build profiles. Each profile may be built for a respective client device or for a user of one or more client devices. The profile may be associated with any identifier (e.g., Media Access Control identifier) of the client device. A profile for a client device (or user thereof) identifies content that was presented when the client device was in a same physical environment as the content presentation system that presented the content.

In an embodiment, an information distribution engine 110 includes hardware and/or software to distribute information associated with the content that is presented by the content presentation system 108. As an example, the information distribution engine 110 may include functionality to transmit the information to a detected client device. The information distribution engine 110 may distribute information associated with the content to (a) a detected client device or (b) to any other device corresponding to a same user as the detected client device. As an example, the information distribution engine may present a name of a movie being played by the content presentation system 108. As another example, the information distribution engine 110 may present a store that sells a product being advertised by the content presentation system 108.

B. Presenting Information Associated with Displayed Content

Figure 2:
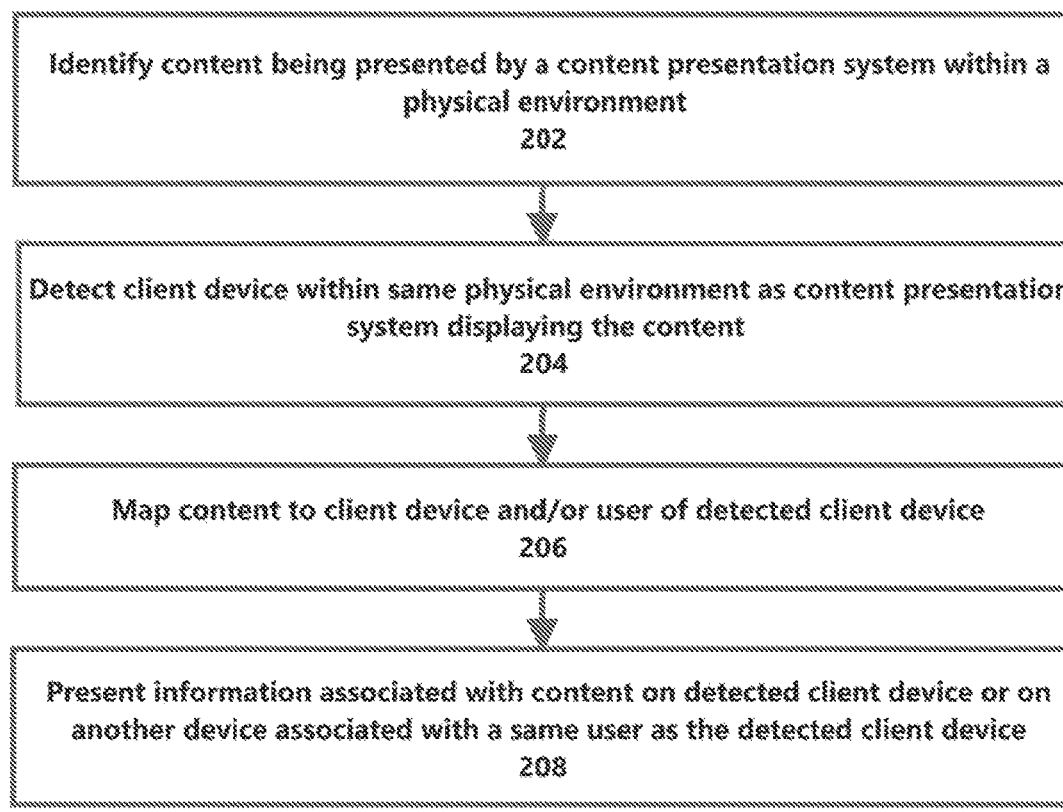
FIG. 2 illustrates example operations in accordance with one or more embodiments.

FIG. 2 includes an example set of operations for presenting information based on content that is presented to a user. In an embodiment, determining that content is presented to a user is equivalent to determining to that content is presented in a physical environment in which a user device, associated with the user, is detected. Other operations not described herein may be used instead and/or in addition to the described operations. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a mapping engine identifies content that is being presented by a content presentation system within a physical environment (Operation 202). The mapping engine may receive a message directly from the content presentation system which identifies the content being presented by the content presentation system. In an example, a program may be presented. The program may be presented when a user switches to a channel playing the program (e.g., via cable, satellite, over-the-air communications, Advanced Television Systems Committee (ATSC) defined protocols, etc.). The program may be presented at a scheduled time on a channel currently being streamed. A program may be presented when a user initiates the streaming of the program via the internet. A program may be presented when a user plays the program from a recorded medium such as a DVD or Blu-ray disc. A program may be presented when a user initiates the playback of the program that was recorded by a Digital Video Recorder (DVR). A program may be presented when a user initiates playback on any device which stores received programs for later playback. When any program is presented, the content presentation system may transmit a message to the mapping engine notifying the mapping engine of the program being presented. Alternatively, the mapping engine may query the content presentation system at a particular time to determine what, if any, content is being presented by the content presentation system.

In an embodiment, an application executing on a client device may detect content being presented by the content presentation system and identify the content to the mapping engine. As an example, the application may record the audio signals detected by a microphone of the client device. The application may query a database of known content with a sample of the audio signals to identify content corresponding to the audio signals. Once the content is identified, the application may identify the content to the mapping engine.

In an embodiment, a mapping engine may be in communication with a content distribution service. The content distribution service is the source of content or any intermediary that forwards the content to the content presentation system from the source of the content. The content distribution service notifies the mapping engine of the content being requested by, transmitted to, and/or displayed by the content presentation system. The content distribution service may be operated, for example, by a company that streams content over the Internet or operated by a traditional cable company that transmits data to a cable television headend.

One or more embodiments include a device detection system detecting a client device within a same physical environment as the content presentation system that is presenting the content (Operation 204). In an example, the device detection system includes Bluetooth Low Energy (BLE) transmitters. The BLE transmitters continuously or periodically transmit Bluetooth signals. A client device, which detects the Bluetooth signals, responds back with an identifier (e.g., a Media Access Control address) corresponding to the client device 104. The BLE transmitters or other any component of the device detection system detects the identifier transmitted by the client device. The device detection system may transmit the identifier received from the client device to the mapping engine. Alternatively or additionally, the device detection system may identify a user associated with the identifier. Identifying the user may include querying a database with the device identifier to obtain user information stored in association with the device identifier. The device detection system may identify the user to the mapping engine. In an example, multiple client devices and/or multiple users may be identified by the device detection system and provided to the mapping engine. As an example, Frank and Daisy's respective cell phones are detected within a bar during the showing of a football game on a television within the bar. The device detection system identifies both Frank and Daisy (or cell phones thereof), and stores information associating both Frank and Daisy to the football game. The device detection system does not identify Taylor's cell phone even though Taylor lives with Frank and Daisy in the same home. As a result, the device detection system does not store any information associating Taylor to the football game.

In an embodiment, the device detection system generates a schedule which identifies all the respective time periods during which each of a set of devices is detected within the same physical environment as the content presentation system. As an example, the device detection system may generate a daily or weekly schedule for users Bob and Marla. The schedule indicates that Bob's cell phone was detected in the family room on Saturday from 10 am to 1 pm and from 5 pm to 7 pm. The schedule may further indicate that Marla's cell phone was detected in the family room from noon to 2 pm and from 5 pm to 7 pm. Furthermore, the device detection system may overlap the user information with demographic information for a family. The device detection system may determine that Bob is watching a movie in his home while Marla (Bob's sister) is also watching the same movie in her home. The movie has a storyline which takes place in Australia. Determining that both siblings are watching the same show may allow for selection of a promotional advertisement that is applicable to both siblings (e.g., a vacation package for visiting Australia).

In an embodiment, the device detection system determines that users are present within a physical environment in response to detecting activity by associated client devices. As an example, a laptop belonging to the user, Joe may be in the family room all day. However, data transmissions above a threshold value from or to the laptop were only detected between 8 pm and 10 pm. Based on the data transmissions, the device detection system determines that Joe was in the family room from 8 pm to 10 pm even though Joe's laptop was determined to have been located in the family room all day.

As another example, a device detection system is configured to determine that a device is located in a room for up to two hours after detecting activity in relation to the device. Each time activity is detected, an inactivity timer is reset to zero. If the inactivity timer reaches two hours (i.e., as a result of two hours passing without detecting movement), then the user of the device is determined to have left the room even though the device itself may still be detected within the room. Stephanie's tablet is initially detected 5 ft from a BLE beacon for 1.5 hours from 7 am to 8:30 am, during which time the tablet is periodically used by Stephanie for browsing the web. Detecting use of the tablet at 8:30 am along with detection of the tablet within the room, is used, by the device detection system, to determine that Stephanie is in the room. The device detection system also resets the timer each time activity associated with the tablet is detected. Thereafter, at 9 am, Stephanie's tablet is detected 12 ft from the BLE beacon. The device detection system determines that the tablet has been moved at 9 am due to a change in the distance. The device detection system resets the inactivity time at 9 am. The device detection system does not detect any further activity (use or movement of the tablet) after 9 am. At 11 am, the inactivity timer reaches 2 hours. As a result of the inactivity time reaching 2 hours, the device detection system determines that the user of the tablet (Stephanie) is no longer in the room.

In addition to, as a sub-step of, or as an alternative to detecting a client device, the device detection system may detect mobile payment systems and/or electronic cards described above. A user associated with a detected mobile payment system and/or a detected electronic card is determined to be present in the physical environment of a content presentation system.

In an embodiment, the mapping engine maps presented content to a client device, or to a user of a client device (Operation 206). When a mapping engine receives data in real-time, the mapping engine maps (a) the content currently being presented by a content presentation system in a particular physical environment with (b) client devices currently detected within the same particular physical environment. Mapping the content to a client device may include storing an association between the content and the client device. Mapping the content to the client device may include storing an association between the content and a user of the client device.

The detection of client devices, associated with users, results in accurate identification of users that are viewing the content displayed by the content presentation system. In an embodiment, all of the content mapped to a particular client device is identified in a profile corresponding to the client device or a profile corresponding to a user of the client device. A profile for a user may include all of the content presented in a physical environment when at least one of the user's devices were detected.

In an embodiment, the mapping engine obtains (a) a schedule of content presented by a content presentation system in a physical environment and (b) a schedule of client devices detected within the same physical environment. Based on both schedules, the mapping engine determines which client devices were detected within the physical environment when each of a set of content was displayed. Client devices, detected during each time period corresponding to the presentation of a respective content item, are identified. The client devices are stored in association with the respective content items.

In an embodiment, storing client devices in association with respective content includes storing a level of interest in the content. An increase in volume, a move of the client device closer to the content presentation system, a rewind of the content, etc. may be used to indicate a high level of interest in the content. A decrease in volume, a move of the client device away from the content presentation system, a forwarding of the content, etc. may be used to determine a low level of interest in the content.

In an embodiment, information associated with the content may be presented by the information distribution engine (Operation 208). Content identified in a profile may be used to generate recommendations, suggestions, advertisements, promotional offers, and/or other information to be presented to a user. The information may be presented on the same detected client device or on another client device associated with a same user as the detected client device.

As an example, a television displays a Marvell production, Spider-Man to a user, Chris of a tablet detected in a same physical environment as the television. The mapping engine stores Marvell productions in association with a user profile for Chris. Based on the stored association, the information distribution engine determines that Thor is another Marvell production which may be of interest to Chris. The information distribution engine adds an advertisement for an upcoming showing of Thor on a webpage to be transmitted to a laptop used by Chris.

C. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

D. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
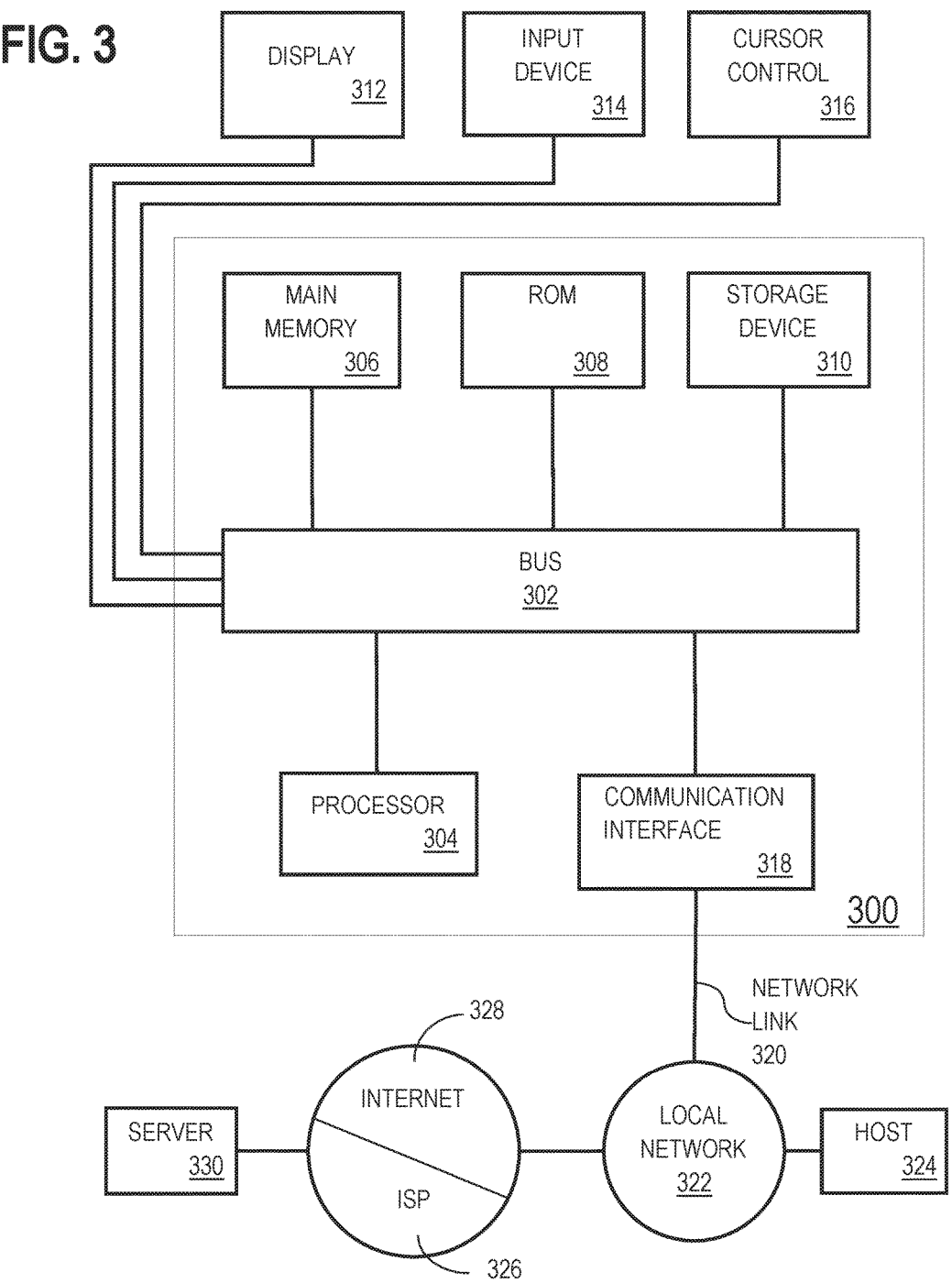
FIG. 3 shows a block diagram example of a system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A non-transitory computer readable medium comprising instructions which, when executed by one or more hardware processors, causes performance of operations comprising:
    identifying a first content displayed by a first content presentation system associated with a first physical environment;
    detecting a mobile payment system within the first physical environment associated with the first content presentation system, wherein the mobile payment system is associated with a user;
    responsive to detecting the mobile payment system within the first physical environment associated with the first content presentation system displaying the first content:
        storing, in a profile associated with the user, information indicating that the user viewed the first content displayed by the first content presentation system;
    identifying a second content displayed by a second content presentation system associated with a second physical environment;
    detecting a user device within the second physical environment associated with the second content presentation system, wherein the user device is associated with the user;
    responsive to detecting the user device within the second physical environment associated with the second content presentation system:
        storing, in the profile associated with the user, information indicating that the user viewed the second content displayed by the second content presentation system.

2. The medium of claim 1, wherein the operations further comprise: transmitting a second set of information, associated with the content, to a device of a user corresponding to the mobile payment system.

3. The medium of claim 1, wherein the content presentation system comprises a television, wherein the content comprises television programming, and wherein the operations further comprise transmitting a web page advertisement to a user device associated with the mobile payment system.

4. The medium of claim 1, wherein storing the information indicating that the user of the mobile payment system viewed the content displayed by the content presentation system is further responsive to determining that the mobile payment system is actively being used by the user when the content is displayed by the content presentation system.

5. The medium of claim 1, wherein the operations further comprise storing, in the profile, a level of interest, in the content, of the user associated with the mobile payment system.

6. The medium of claim 5, wherein the level of interest is determined based on one or more of:
    an interaction with the content presentation system to forward, pause, rewind, or replay the content;
    a change in audio volume during the display of the content by the content presentation system;
    a change in a location of the mobile payment system.

7. The medium of claim 1, wherein the operations further comprise transmitting the information to a user device associated with the user of the mobile payment system.

8. The medium of claim 1, wherein the operations further comprise: transmitting an advertisement associated with the content to a user device associated with the mobile payment system.

9. The medium of claim 1, wherein the content comprises media content, and wherein the operations further comprise: transmitting at least one of a name of the media content and a person associated with the media content to a user device associated with the mobile payment system.

10. The medium of claim 1, wherein detecting the mobile payment system within the physical environment comprises detecting the mobile payment system via a wireless signal.

11. The medium of claim 1, wherein detecting the mobile payment system further comprises detecting the mobile payment system within a particular physical distance from the content presentation system.

12. The medium of claim 1, wherein the operations further comprise storing an identifier, corresponding to the content, in association with the profile associated with the mobile payment system.

13. The medium of claim 1, wherein the mobile payment system is a credit card.

14. A non-transitory computer readable medium comprising instructions which, when executed by one or more hardware processors, causes performance of operations comprising:
- identifying a first content displayed by a first content presentation system associated with a first physical environment;
- detecting an electronic card within the first physical environment associated with the first content presentation system, wherein the mobile payment system is associated with a user;
- responsive to detecting the electronic card within the first physical environment associated with the first content presentation system displaying the first content:
- storing, in a profile associated with the user, information indicating that the user viewed the first content displayed by the first content presentation system;
- identifying a second content displayed by a second content presentation system associated with a second physical environment;
- detecting a user device within the second physical environment associated with the second content presentation system, wherein the user device is associated with the user;
- responsive to detecting the user device within the second physical environment associated with the second content presentation system:
- storing, in the profile associated with the user, information indicating that the user viewed the second content displayed by the second content presentation system.

15. The medium of claim 14, wherein detecting the electronic card within the physical environment comprises detecting the electronic card via a wireless signal.

16. The medium of claim 14, wherein the electronic card is a keycard.

17. The medium of claim 14, wherein the electronic card is an identification card.

18. The medium of claim 14, wherein detecting the electronic card within the physical environment comprises detecting the electronic card via Near-Field Communication (NFC).

19. A non-transitory computer readable medium comprising instructions which, when executed by one or more hardware processors, causes performance of operations comprising:
- identifying content displayed by a content presentation system associated with a physical environment;
- determining that a mobile payment system is within the physical environment associated with the content presentation system based on information about wireless signals detected by the mobile payment system from a plurality of devices;
- responsive to determining the mobile payment system is within the physical environment associated with the content presentation system displaying the content:
- storing, in a profile associated with the mobile payment system, information indicating that a user of the mobile payment system viewed the content displayed by the content presentation system.

20. A non-transitory computer readable medium comprising instructions which, when executed by one or more hardware processors, causes performance of operations comprising:
- identifying content displayed by a content presentation system associated with a physical environment;
- detecting a mobile payment system within the physical environment associated with the content presentation system;
- responsive to detecting the mobile payment system within the physical environment associated with the content presentation system displaying the content:
- transmitting information, associated with the content, to a user device for presentation at the user device, wherein the user device is associated with a same user as the mobile payment system, and the user device and the mobile payment system are different.

* * * * *